United States Patent [19]

Kimura et al.

[11] 4,400,287

[45] Aug. 23, 1983

[54] HEAT STORAGE MATERIAL

[75] Inventors: Hiroshi Kimura; Junjiro Kai, both of Amagasaki, Japan

[73] Assignee: Mitsubishi Denki Kabushiki Kaisha, Tokyo, Japan

[21] Appl. No.: 343,767

[22] Filed: Jan. 28, 1982

[30] Foreign Application Priority Data

Mar. 9, 1981 [JP] Japan .................................. 56-34075
Nov. 12, 1981 [JP] Japan ............................. 56-182533
Nov. 30, 1981 [JP] Japan ............................. 56-194723

[51] Int. Cl.$^3$ .............................................. C09K 3/18
[52] U.S. Cl. ..................................... 252/70; 165/10; 165/104.17; 165/DIG. 4; 126/400
[58] Field of Search .......... 252/70; 165/10 A, 104.17, 165/DIG. 4; 126/400

[56] References Cited

U.S. PATENT DOCUMENTS 4,077,390  3/1978  Stanley et al. ............................ 126/263

FOREIGN PATENT DOCUMENTS 1928694  12/1969  Fed. Rep. of Germany .
2550106  5/1976  Fed. Rep. of Germany .
2448739  9/1976  Fed. Rep. of Germany .
2639176  3/1978  Fed. Rep. of Germany .
53-14173  5/1978  Japan .
53-6285  7/1978  Japan .
53-6286  7/1978  Japan .

OTHER PUBLICATIONS

Journal of the Japanese Association Crystal Growth, vol. 7, No. 3 & 4; p. 215, (1980), "Nucleation and Supercooling of Some Hydrates", Hiroshi Kimura.

*Primary Examiner*—John E. Kittle
*Assistant Examiner*—Robert A. Wax
*Attorney, Agent, or Firm*—Oblon, Fisher, Spivak, McClelland & Maier

[57]  ABSTRACT

A heat storage material comprises $NaCH_3COO \cdot 3H_2O$ as a main component and a nucleating agent comprising 95 to 10 wt. % of anhydrous sodium acetate and 5 to 90 wt. % of at least one of the other sodium salts selected from the group consisting of $Na_3PO_4$, $Na_2HPO_4$, $NaH_2PO_4$, $NaNH_4PO_4 \cdot 4H_2O$, $Na_5P_3O_{10}$, $C_6H_5Na_2PO_4 \cdot 2H_2O$, $NaBO_2 \cdot 2H_2O$, $Na_2B_4O_7 \cdot 10H_2O$, $Na_2C_2O_4$, $NaBr$, $NaCl$, $CH_2(COONa)_2 \cdot H_2O$, $(CHCOONa)_2 \cdot H_2O$, $(CH_2COONa)_2 \cdot 6H_2O$, $HOC(CH_2)_2(COONa)_2 \cdot 2H_2O$, $CH_3(CH_2)_2COONa$, $CH_3(CH_2)_6COONa$, $HOOCCH(NH_2)(CH_2)_2COONa \cdot H_2O$ sodium oleate, and sodium stearate.

18 Claims, 6 Drawing Figures

HEAT STORAGE MATERIAL

BACKGROUND OF THE INVENTION

1. Field of the Invention

The present invention relates to a heat storage material of $NaCH_3COO.3H_2O$ or a mixture thereof which utilizes the latent heat of fusion. The heat storage material is used for air-conditioning, waste heat recovery or solar heat storage.

2. Description of the Prior Art

As a heat storage material in a range of 50°–60° C. which utilizes a latent heat of fusion, a hypo ($Na_2S_2O_3.5H_2O$; melting point of 48° C.; heat of fusion of 50 cal/g) has been proposed. However, it has not been recently considered to be important because of an easy solidification of $Na_2S_2O_3.2H_2O$ which causes inferior phase change stability and no practical development of a nucleating method.

On the other hand, $NaCH_3COO.3H_2O$ has an excellent phase change stability higher than that of hypo. Thus, $NaCH_3COO.3H_2O$ has been recently considered to be important. However, $NaCH_3COO.3H_2O$ (melting point of 58° C.; heat of fusion of 60 cal/g.) is as remarkably super-coolable as hypo. Therefore, in order to utilize the latent heat of fusion, it is most important to prevent the supercooling. It has been known to prevent the supercooling by adding water to $NaCH_3COO.3H_2O$ i.e. the prior invention disclosed in Japanese Unexamined Patent Publication 126980/1976. Although the supercooled state is easily broken by the addition of water, reliability for a long time is not satisfactory. The nucleating agent such as $Na_2(CH_2COO)_2.6H_2O$, i.e. the prior invention disclosed in Japanese Unexamined Patent Publication 16035/1980, does not impart the nucleating effect unless cooled to 30° C. or lower whereby there is the disadvantage or narrowly limited applications.

The mixture of $NaCH_3COO.3H_2O$ and another salt, such as $NaBr.2H_2O$, at a content of 10 wt. %, i.e. the prior invention disclosed in Japanese Unexamined Patent Publication 14173/1978, allows repeated smooth phase changes for more than 400 times in a heat cycle test of 60° C.–40° C. (8 cycles per day). Although, the mixture thereof containing $NaHCOO.3H_2O$ at a content of 16 wt. % can have the self-nucleating effect, the reliability is not disadvantageously high.

As described, the nucleating method for the heat storage material made of $NaCH_3COO.3H_2O$ or a mixture of $NaCH_3COO.3H_2O$ is partially successful, however, it is not practically successful. There is no report on the nucleating agent for $NaCH_3COO.3H_2O$ other than the inventors' prior disclosures. In accordance with the method of U.S. Pat. No. 4,077,390, the metal piece in the liquid must be externally bent at the nucleation for each time. Thus, the method is not practically employed.

SUMMARY OF THE INVENTION

It is an object of the present invention to overcome the aforementioned disadvantages and to provide a heat storage material, a supercooled state of which is repeatedly broken at a desired temperature and which has excellent phase change stability for a long time.

The foregoing and other objects of the present invention have been attained by providing a heat storage material of $NaCH_3COO.3H_2O$ or a mixture of $NaCH_3COO.3H_2O$ as a main component in which a nucleating agent of anhydrous sodium acetate and another sodium salt is incorporated. The nucleating agent can also be a mixture of anhydrous sodium acetate, another sodium salt and a thermoplastic organic material. The nucleating agent can be also a mixture of anhydrous sodium acetate, another sodium salt and a thermoplastic organic material with a network structured support.

DETAILED DESCRIPTION OF THE PREFERRED EMBODIMENTS

Figure 1:
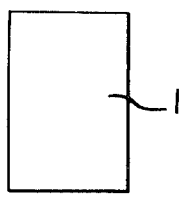
FIG. 1 shows a molded product having no support.

The present invention has been attained by repeating tests and studies of nucleating agents for a long time and finding the fact that the mixtures of anhydrous sodium acetate and other sodium compounds shown in Table 1 impart excellent nucleating effect to $NaCH_3COO.3H_2O$ or a mixture of $NaCH_3COO.3H_2O$ as a main component in the temperature region just below the melting point.

The characteristics of the sodium compounds shown in Table 1 are not easily stated. They can be mainly classified into four groups: as sodium salts of various phosphoric acids; sodium salts of boric acids; sodium halides; and sodium salts of organic carboxylic acids. In view of the crystalline system of the sodium salts, only borax and $NaH_2PO_4$ belong to the monoclinic crystalline system, the same as $NaCH_3COO.3H_2O$; sodium malonate monohydrate belongs to the orthorhombic crystalline system; and $NaNH_4HPO_4.4H_2O$ belongs to the triclinic crystalline system. The crystalline system of many compounds is not clear.

In view of the stable phase of the compounds at 40°–70° C., $NaBr.2H_2O$ belongs to the monoclinic crystalline system; and $NaH_2PO_4.2H_2O$ and $Na_2HPO_4.2H_2O$ belong to the orthorhombic crystalline system. In these seven compounds, the $Na^{+1}$ ion has the six coordinated octahedron structure and the melting points of the compounds are 40° C. or higher.

TABLE 1

| | Sodium salt mixed with anhydrous sodium acetate | | |
|---|---|---|---|
| Compound | Formula | Stable phase at 70° C. | Stable phase at 40° C. |
| Trisodium phosphate | $Na_3PO_4$ | $10H_2O$ | $10H_2O$ |
| Disodium hydrogenphosphate | $Na_2HPO_4$ | $2H_2O$ | $7H_2O$ |
| Monosodium dihydrogen- | $NaH_2PO_4$ | anhydrous | $2H_2O$ |

TABLE 1-continued

Sodium salt mixed with anhydrous sodium acetate

| Compound | Formula | Stable phase at 70° C. | Stable phase at 40° C. |
|---|---|---|---|
| phosphate | | | |
| Monosodium ammonium-hydrogen phosphate tetrahydrate | $NaNH_4HPO_4.4H_2O$ | $4H_2O$ | $4H_2O$ |
| Sodium tripoly-phosphate | $Na_5P_3O_{10}$ | | |
| Disodium phenyl-phosphate dihydrate | $C_6H_5Na_2PO_4.2H_2O$ | | |
| Sodium metaborate dihyrate | $NaBO_2.2H_2O$ | $2H_2O$ | $4H_2O$ |
| Borax | $Na_2B_4O_7.10H_2O$ | anhydrous | $10H_2O$ |
| Sodium oxalate | $Na_2C_2O_4$ | | |
| Sodium bromide | $NaBr$ | anhydrous | $2H_2O$ |
| Sodium chloride | $NaCl$ | | |
| Disodium malonate monohydrate | $CH_2(COONa)_2.H_2O$ | | |
| Disodium maleate monohydrate | $(:CHCOONa)_2.H_2O$ | | |
| Disodium succinate hexahydrate | $(CH_2COONa)_2.6H_2O$ | anhydrous | $6H_2O$ |
| Trisodium citrate dihydrate | $HOC(CH_2)_2(COONa)_3.2H_2O$ | | |
| Sodium n-butyrate | $CH_3(CH_2)_2COONa$ | | |
| Sodium caprylate | $CH_3(CH_2)_6COONa$ | | |
| Monosodium L-glutamate monohydrate | $HOOCCH(NH_2)(CH_2)_2COONa.HO$ | | |
| Sodium oleate | $C_{17}H_{33}COONa$ | | |
| Sodium stearate | $NaC_{18}H_{35}O_2$ | | |

Sometimes, the similar nucleating effect may be imparted by using a hydrate instead of the anhydrous sodium salts shown in Table 1 (for example, the dihydrate instead of $NaH_2PO_4$). In many cases, however, the anhydrous sodium salts shown in Table 1 impart a superior effect.

When the anhydrous sodium salts are used instead of the hydrates shown in Table 1 (for example, the anhydrous salt instead of $Na_2B_4O_7.10H_2O$), the desired effect may not be imparted. The sodium salts beside the sodium salts shown in Table 1 are used in the test, thereby finding the fact that $Na_2SO_4$, $Na_2CO_3$, $Na_2HC_2O_4$, $NaF$, monosodium fumarate, sodium hexamethaphosphate, monosodium hydrogen tartarate monohydrate, monosodium L-aspartate monohydrate, sodium pyrophosphate, sodium propionate and disodium DL-maleate, do not impart the nucleating effect to $NaCH_3COO.3H_2O$ or a mixture of $NaCH_3COO.3H_2O$ as a main component at any ratio.

The nucleating agent for $NaCH_3COO.3H_2O$ or a mixture thereof can be produced by mixing anhydrous sodium acetate with one or more of the sodium salts shown in Table 1. The mixture is easily disintegrated. In order to prevent the disintegration, it is preferable to press-mold under a desired pressure or to incorporate a suitable binder at a desired content or to cover a surface of a molded product with a suitable layer.

The nucleating effect of the mixture is not affected by such treatment. Thus, in order to impart excellent nucleating effect for a long time, the optimum content of the other sodium salt is selected. The tests were carried out by using $Na_2HPO_4$ and sodium oleate. The results are shown in Table 2.

TABLE 2

| Sample No. | \multicolumn{7}{c}{Additive content (mol %)} | | | | | | |
|---|---|---|---|---|---|---|---|
| | 1 | 2 | 3 | 4 | 5 | 6 | 7 |
| Addition of | 6 | 12 | 25 | 50 | 75 | 90 | — |
| $Na_2HPO_4$ | | | | | | | |
| Nucleating effect | good | good | good | good | bad | slight bad | |
| Temperature for breaking super-cooled state (°C.) | 49.0 | 48.3 | 48.0 | 47.8 | — | 47.3 | |
| Addition of sodium oleate | 3 | 6 | 12 | 25 | 50 | 75 | 94 |
| Nucleating effect | good | good | good | good | good | slight bad | bad |
| Temperature for breaking super-cooled state (°C.) | 48.7 | 49.3 | 49.5 | 49.4 | 49.6 | 46.0 | — |

In the case of the nucleating agent containing $Na_2HPO_4$, the favorable content of $Na_2HPO_4$ for imparting superior nucleating effect is on the lower side of the content range of test samples.

The temperature for breaking the supercooled state is the measured datum in the case of the mixture of $NaCH_3COO.3H_2O$ and 16 wt.% of $NaHCOO.3H_2O$. The temperature is higher depending upon the decrease of the content of $Na_2HPO_4$ (Samples No. 1 and No. 2).

A similar tendency is found in the case of the nucleating agent containing sodium oleate. When the content of the sodium salt is more than 75 mol %, the nucleating effect is inferior. The temperature for breaking the supercooled state is high when the content of sodium oleate of 6–50 mol %. A similar tendency to that of the use of sodium oleate is found in the case of the nucleating agent containing NaBr. The reliability of the nucleating effect is not high in the case of a content of NaBr of less than 5 mol % or more than 75 mol %. Thus, a suitable content of the other sodium salt for the practical nucleating agent is in a range of 5–75 mol %. The optimum content for imparting the highest nucleating effect is dependent upon the kind of the sodium salt and is in a range of about 10 to 25 mol %.

The mechanism of the nucleation of NaCH$_3$COO.3H$_2$O by the nucleating agent is found to be difficult to clarify by experiments. The detail of the mechanism is not clear. There is no report concerning the phenomenon. Thus, the detail of the phenomenon cannot be described in detail. It is the remarkable fact that anhydrous sodium acetate, by itself, or the other sodium salts shown in Table 1, by themselves, do not impart any nucleating effect for NaCH$_3$COO.3H$_2$O or a mixture thereof; however, a mixture of anhydrous sodium acetate and the sodium salt imparts the nucleating effect to the heat storage material. That is, the nucleating effect is achieved by mixing anhydrous sodium acetate and the other sodium salts shown in Table 1. The nucleating effect is not achieved by only one component either of anhydrous sodium acetate or the other sodium salt. It is considered that the special site for heterogeneous nucleation of NaCH$_3$COO.3H$_2$O may be formed in such a mixture.

In a heat cycle test of 60° C.–40° C. (heating for 1 hour; air cooling for 2 hours; 8 cycles per day) of the mixture of NaCH$_3$COO.3H$_2$O with the nucleating material, the crystalline growth of NaCH$_3$COO.3H$_2$O from the nucleating agent is found in the solidification process. The phenomenon is the same in both the floating and the sedimentary nucleating agent.

When a nucleating agent containing anhydrous sodium acetate and 20 mol % Na$_2$HPO$_4$ is incorporated in the mixture of NaCH$_3$COO.3H$_2$O and 16 wt. % of NaHCOO.3H$_2$O, the average temperature for breaking the supercooled state for 50 times is 47.8° C. The solidification was initiated at a similar temperature ($\pm 1°$ C.) in the case of the use of a nucleating agent containing NaBr or borax. Even though the mechanism of the nucleation is unclear, the present invention is to utilize anhydrous sodium acetate in the nucleation of NaCH$_3$COO.3H$_2$O. (In the past, anhydrous sodium acetate has been considered to be an undesirable precipitate.)

When only anhydrous sodium acetate is added without adding the nucleating agent, to NaCH$_3$COO.3H$_2$O, the solidification is not initiated by cooling to about 10° C. and the supercooled state is maintained.

In the examples of the embodiment the nucleating agent imparts the nucleating effect in the original form. When some sodium salt such as NaBr is used, the original form of the nucleating agent may be broken. However, it is confirmed that the nucleating effect is maintained when a mixed layer of anhydrous NaCH$_3$COO and NaBr is reformed on the surface of molten NaCH$_3$COO.3H$_2$O. Thus, it is unnecessary to carefully consider the maintenance of the shape of the nucleating agent.

In the examples, the nucleating agent is charged with the heat storage material into a container. Thus, it is possible to use the nucleating agent by fixing it at one or more positions in the container. It is possible to support the nucleating agent on a support to give a density lower than that of the heat storage liquid so as to float the nucleating agent on the liquid.

In accordance with the present invention, the nucleating agent having the following effects to the heat storage material of NaCH$_3$COO.3H$_2$O or a mixture thereof is obtainable:

(1) An economical nucleating agent is obtained by adding a small amount of an economical compound to anhydrous NaCH$_3$COO.

(2) The main component of the nucleating agent is the same as the main component of the heat storage material whereby any disadvantageous reaction is not caused and a compound for preventing the phase change stability is not formed.

(3) The nucleating agent having a desired formulation can be selected from a broad range depending upon the composition of the heat storage material and the temperature.

(4) The nucleating material can be molded in a desired shape.

The heat storage material of NaCH$_3$COO.3H$_2$O or a mixture thereof with the nucleating material can repeat the heat storage-discharge cycle in high reliability and remain stable in the operational temperature region.

The nucleating agents impart excellent nucleating effect to a mixture containing NaCH$_3$COO.3H$_2$O as the main component, such as mixtures of NaCH$_3$COO.3H$_2$O and 5–20 wt. % of NaHCOO.3H$_2$O or 5–15 wt. % of NaBr.2H$_2$O or other components in the same or higher extent compared with that for only NaCH$_3$COO.3H$_2$O.

In another embodiment of the present invention, a nucleating agent obtained by molding a mixture of anhydrous sodium acetate, the other sodium salt and a thermoplastic organic material by a hot-press method is added to NaCH$_3$COO.3H$_2$O or a mixture thereof as the main component.

The other sodium salts are the same as in the former embodiment. It is preferable to use Na$_2$HPO$_4$, Na$_2$HPO$_4$.2H$_2$O, NaH$_2$PO$_4$, NaH$_2$PO$_4$.H$_2$O, NaH$_2$PO$_4$.2H$_2$O or a mixture thereof.

The typical thermoplastic organic materials include plastics such as polyethylene, polypropylene, polystyrene, polyvinyl chloride, ABS resin, and acryl resin; and natural waxes such as rosin and carnauba wax; and synthetic wax. The thermoplastic organic material is preferably used in a form of powder having a diameter of 1 mm or less. When the diameter of powder is more than 1 mm, it is disadvantageously mixed in an undesired bulk density in the nucleating agent by the press-molding.

Anhydrous sodium acetate, the other sodium salt and the thermoplastic organic material are thoroughly mixed and pulverized and molded by the hot-press to form a desired nucleating agent.

It is preferable to carry out the hot-press at higher than room temperature (about 30° C.) and lower than the melting point of the thermoplastic organic material. The temperature is selected depending upon the kind of the thermoplastic organic material or the final bulk density of the nucleating agent. When the temperature is near the melting point, a high density of the nucleating agent is obtained.

The pressure of the hot-press is selected depending upon the kind of the thermoplastic organic material and the final bulk density of the nucleating agent. When the temperature in the hot-press is high, the pressure can be lower whereas, when the temperature is low, the pressure must be higher. The pressure is usually in a range of several hundreds kg/cm$^2$ to several tons/cm$^2$.

The reason why the nucleating effect is imparted by adding the nucleating agent to the heat storage material of NaCH$_3$COO.3H$_2$O is not clearly found. The reason cannot be theoretically illustrated. The nucleating agent obtained by press-molding a mixture of anhydrous sodium acetate, the other sodium salt such as Na$_2$HPO$_4$ and a thermoplastic organic material such as polyethylene imparts remarkably superior nucleating effect in comparison with the nucleating agent obtained by press-molding without using a thermoplastic organic material. Thus, the combination of the sodium salt such as $Na_2HPO_4$ and the thermoplastic organic material such as polyethylene does not contradict but results in a synergistic effect for the nucleating effect. The thermoplastic organic material has the function of a binder. When the content of the binder increases, the nucleating agent having high strength which is not easily dissolved or disintegrated in the heat storage material is obtained. By the hot-press molding, the bulk density of the nucleating agent is improved and the mechanical strength is improved and the nucleating effect having high reliability for a long time is given.

For example, a nucleating agent obtained by pressing a mixture of 20 wt. % of $NaHPO_4$, 20 wt. % of polyethylene and 60 wt. % of anhydrous sodium acetate under a pressure of 1 ton/$cm^2$ at room temperature has a low enough bulk density to float on a molten $NaCH_3COO.3H_2O$, whereas, a nucleating agent obtained by hot-pressing the same mixture under the same pressure at 80° C. has a high bulk density and sinks to the bottom in the molten $NaCH_3COO.3H_2O$ and the superior effect as the nucleating agent is imparted.

The nucleating agent of this embodiment can be used not only for the heat storage material of only $NaCH_3COO.3H_2O$ but also the heat storage material of a mixture of $NaCH_3COO.3H_2O$ and other components such as 5-20 wt. % of $NaHCOO.3H_2O$, or 5-15 wt. % of $NaBr.2H_2O$ thereby imparting the same or superior nucleating effect for a long time.

As described, the nulceating agent obtained by hot-pressing a mixture of anhydrous sodium acetate, the other sodium salt and the thermoplastic organic material has the following advantages:

(1) It has high strength and high reliability for a long time.
(2) A quality control is easily carried out to give high reproducibility.
(3) It can be produced in less steps.
(4) A bulk density is high.

In another embodiment, a nucleating agent obtained by hot-pressing a mixture of anhydrous sodium acetate, the other sodium salt, a thermoplastic organic material and a network structured support is added to a heat storage material of $NaCH_3COO.3H_2O$ or a mixture thereof.

In the repeated phase change of the heat storage material, the nucleating agent of the former embodiment is subjected to strain caused by contraction in the solidification or expansion in the melting whereby the molded product is disintegrated after several hundred heat cycles. Even though the molded product is disintegrated, the nucleating effect is not substantially lost. When the disintegrated mass of the nucleating agent floats on the molten heat storage materials, the nucleating effect may be imparted for several hundred times. In practical use, sometimes, the disintegration is not troublesome as far as the nucleating effect is maintained. However, the disintegration may cause trouble in the case of the requirement of a precise positioning of the nucleating agent.

This embodiment is to overcome the stated disadvantage. In the hot-press of a mixture of anhydrous sodium acetate, $Na_2HPO_4$ and the thermoplastic organic material powder such as polyethylene, a network structured support made of a plastic such as nylon is embedded in the molded product or is placed on both surfaces of the molded product in a sandwich form to produce a nucleating agent having high durability and high reliability in high reproducibility.

The feature of the embodiment is as described above. As described, the reason why the nucleating agent imparts the nucleating effect to $NaCH_3COO.3H_2O$ is not clear and cannot be described in detail.

The effect of the hot-press is to produce a molded product having high strength by hot-pressing the mixture containing the thermoplastic organic material powder, such as polyethylene, to partially melt the powder such as polyethylene.

In order to prevent the disintegration of the molded product by stress produced by the phase change of the heat storage material, the network structured support is used in the hot-press to reduce the stress and the molded product having the support is used in a practical purpose.

FIG. 1 shows the molded product having the original structure; and FIGS. 2 to 6 show the molded products of the embodiment.

Figure 2:
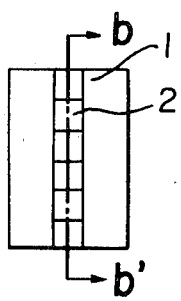
FIG. 2 shows a molded product having a support embedded at the center.
Figure 3:
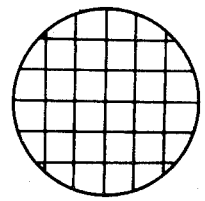
FIG. 3 is a sectional view taken along the line b—b'.
Figure 5:
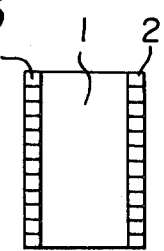
FIG. 5 is a sectional view taken along the line c—c'.
Figure 4:
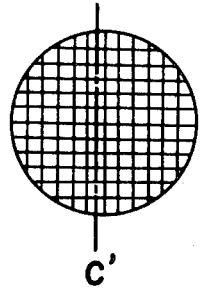
FIG. 4 shows a side view of the molded product having the support in another embodiment.
Figure 6:
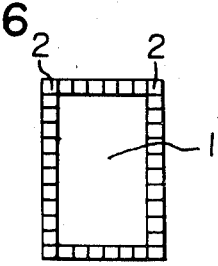
FIG. 6 is a sectional view of the molded product in still another embodiment.

FIG. 1 shows the molded product of the mixture (1) having the uniform system; FIG. 2 shows the molded product embedding the support (2) at the center; FIG. 5 shows the molded product having two supports (2) on both surfaces in a sandwich structure; and FIG. 6 shows the molded product having two supports (2) to form a closed structure by placing on both surfaces and to cover all surfaces of the molded product.

The function will be illustrated.

In the case of the molded product having the structure shown in FIG. 1, the stress applied to all surfaces is received by the molded product and the molded product has the uniform system and accordingly the molded product is weak against the bending stress. Therefore, disintegration is easily caused in such structure.

When the mesh support is embedded at the center, as shown in FIG. 2, the material having higher strength is placed at the center of the molded product, it has a relatively high durability to bending stress, etc. and, accordingly, the disintegration of the molded product is prevented. The size of the mesh of the support is preferably about several mm in diameter, so as to be highly bonded. The thickness of the support is selected depending upon the thickness of the molded product and is preferably several mm or less in practical use.

The molded product having two supports on both surfaces in a sandwich form as shown in FIG. 5 has the following advantages. The partial pressure applied to the part for nucleating effect among the total pressure applied to the molded product is only for the area in the opening holes on the surface area of the supports. The partial pressure is remarkably smaller than the total pressure. Even though the bending stress is applied to the molded product, the stress is absorbed by the supports to provide a molded product having high durability. The size of the mesh of the support is relatively smaller than that of the embodiment of FIG. 2 and is preferably in a range of 1 mm-50$\mu$ in diameter. When the diameter is less than 50$\mu$, the nucleating effect of the molded product is not easily applied to the heat storage material through the holes of the mesh. Thus, it is unfavorable.

The molded product shown in FIG. 6 is the improvement over the embodiment of FIG. 5. All surfaces of the molded product are covered by the mesh support.

The durability is higher than that of the embodiment of FIG. 5.

The materials for the support can be thermosetting resins such as nylon, bakelite, melamine resin and urea resin; thermoplastic resins such as polyethylene, polystyrene, various acryl resins, polypropylene, and polyvinyl chloride; and metals such as aluminum, iron and stainless steel.

The process for preparing the molded product shown in FIG. 5 is as follows: One support is placed in a press mold and a mixture of 50 wt. % of anhydrous sodium acetate, 20 wt. % of $Na_2HPO_4$ and 30 wt. % of polyethylene powder was charged and one support is placed on it and then, it is hot-pressed and the molded product is taken out.

In accordance with this embodiment using a network structured support, anhydrous sodium acetate, the other sodium salt such as $Na_2HPO_4$ and a thermoplastic organic powder having a melting point of 60° C. or higher are thoroughly mixed and hot-pressed with a network structured support. Thus, the following effects are given as the nucleating agent for the composition of $NaCH_3COO.3H_2O$:

(a) A nucleating agent having the higher durability and excellent reliability is obtained.

(b) A quality control is easily attained with high reproducibility.

(c) The bulk density of the nucleating agent can be high. When a plastic support is used, the nucleating agent can float on the heat storage material. When a metallic support is used, the nucleating agent is sedimentated in the bottom of the heat storage material.

(d) The mechanical strength is high and handling is easy.

The present invention will be further illustrated by certain examples.

EXAMPLE 1

A mixture of anhydrous sodium acetate and 20 mol % of $Na_2HPO_4$ was pressed under a pressure of 1000 $kg/cm^2$ to form a disc having a diameter of 15 mm and a thickness of 2 mm. A solution of polystyrene in toluene was penetrated into the disc and the disc was dried for reinforcement. One disc was charged into 1 kg of $NaCH_3COO.3H_2O$ kept in an aluminum container and the container was sealed.

In a heat cycle test at 70° to 40° C. (8 cycles per day), the supercooled state of the product was broken at 50° C. or higher and the smooth phase change of solidification-fusion was stably repeated for 200 times or more.

EXAMPLE 2

A mixture of anhydrous sodium acetate and 25 mol % of NaBr and polyethylene powder (100 mesh) as a binder at a content of 5 wt. % was pressed under a pressure of 200 $kg/cm^2$ to form a disc having a diameter of 15 mm and the disc was heated at higher than 100° C. for several minutes to melt a part of the polyethylene powder thereby forming a nucleating agent. A mixture of $NaCH_3COO.3H_2O$ and $NaBr.2H_2O$ at a content of 10 wt. % as a heat storage material was charged into a black polyethylene container having an inner diameter of 50 mm and a length of 800 mm and two discs of the nucleating agent were charged and the container was sealed.

In a heat cycle test at 60° to 40° C., the smooth phase change was repeated for 500 times or more and the supercooled state was broken at an average temperature of 53.6° C.

EXAMPLE 3

A mixture of anhydrous sodium acetate and 20 mol % of borax was pressed under a pressure of 3000 $kg/cm^2$ to form a molded product. A mixture of $NaCH_3COO.3H_2O$ and $NaCHOO.3H_2O$ at a content of 16 wt. % as a heat storage material and the molded product at a content of 0.05 wt. % were charged in a polyethylene container and the container was sealed.

In a heat cycle test at 60° to 40° C., the smooth phase change was repeated for 300 times or more and the supercooled state was broken at an average temperature of 47.5° C.

EXAMPLE 4

In accordance with the process of Example 2 except using $NaNH_4HPO_4.4H_2O$ instead of NaBr, a test was carried out to confirm the fact that the smooth phase change was repeated at 50° C. or higher.

EXAMPLE 5

In accordance with the process of Example 3 except using disodium malonate monohydrate instead of borax, a test was carried out. The supercooled state of the product was broken at an average temperature of 47.0° C. and the smoother phase change was repeated.

EXAMPLE 6

In accordance with the process of Example 1 except using disodium maleate monohydrate instead of $Na_2HPO_4$, a test was carried out to confirm the fact that the smooth phase change was repeated at 50° C. or higher.

EXAMPLE 7

In accordance with the process of Example 1 except using $NaH_2PO_4$ at the same content instead of $Na_2HPO_4$, a test was carried out. The supercooled state of the product was broken at 50° C. or higher and the smooth phase change was repeated.

EXAMPLE 8

A mixture of $NaCH_3COO.3H_2O$ and $NaHCOO.3H_2O$ at a content of 8 wt. % was used as a heat storage material. A nucleating agent was produced by admixing 10 mole % of sodium oleate with anhydrous $NaCH_3COO$ and adding rosin as a binder at a content of 5 wt. % and pressing the mixture under a pressure of 2000 $kg/cm^2$ to form a disc having a thickness of 2 mm and a diameter of 20 mm. The heat storage material and one disc were charged into an aluminum container having an inner diameter of 50 mm and a height of 200 mm and the container was sealed. The supercooled state of the product was broken at about 53° C. and the smooth phase change was repeated.

EXAMPLE 9

In accordance with the process of Example 8 except using sodium stearate at the same content instead of sodium oleate, a test was carried out. The phase change characteristic of the product was substantially the same as that of the use of sodium oleate.

EXAMPLE 10

In accordance with the process of Example 8 except using 20 mol % of sodium n-butyrate instead of 10 mol % of sodium oleate, a test was carried out. The supercooled state of the product was broken at 48° C. or higher and the smooth phase change was repeated for a long time.

EXAMPLE 11

In accordance with the process of Example 2 except using NaCl at the same content instead of NaBr, a test was carried out. The supercooled state of the product was broken at 50° C. or higher and the smooth phase change was repeated.

EXAMPLE 12

A mixture of $NaCH_3COO.3H_2O$ and water at a content of 3 wt. % was used as a heat storage material which had a heat of fusion of 50 cal/g. or more.

A mixture of anhydrous sodium acetate and 15 mol % of sodium tripolyphosphate and an epoxy resin curable at room temperature at 3 wt. % as a binder was hot-pressed to form a nucleating agent. The heat storage material and the nucleating agent were charged into a stainless steel container and the container was sealed. The supercooled state of the product was broken at 50° C. or higher and the smooth phase change was repeated for a long time.

EXAMPLE 13

In accordance with the process of Example 12 except using disodium phenylphosphate at the same content instead of sodium tripolyphosphate, a test was carried out. The phase change characteristic of the product was substantially the same as that of sodium tripolyphosphate.

EXAMPLE 14

In accordance with the process of Example 12 except using $NaBO_2.2H_2O$ at the same content instead of sodium tripolyphosphate to form a nucleating agent, a test was carried out. It was confirmed that the product had substantially the same heat storage-discharge characteristic.

EXAMPLE 15

A mixture of $NaCH_3COO.3H_2O$ and $NaBr.2H_2O$ at a content of 5 wt. % was used as a heat storage material.

A mixture of anhydrous sodium acetate and 20 mol % of $Na_2C_2O_4$ and a thermoplastic acrylic resin powder as a binder at a content of 5 wt % was pressed under a pressure of 1000 $kg/cm^2$ or higher to form a sheet having a thickness of 3 mm as a nucleating agent. The heat storage material and the nucleating agent at a content of several grams based on 1 kg of the heat storage material were charged into a block polyethylene container and the container was sealed. The super-cooled state of the product was broken at 50° C. and higher and the smooth phase change was repeated for a long time.

EXAMPLE 16

In accordance with the process of Example 15 except using disodium succinate hexahydrate at the same content instead of $Na_2C_2O_4$, a nucleating agent was produced and a test was carried out. The product obtained by using $Na_2C_2O_4$ had the same heat storage-discharge characteristic as that of Example 15. The phase change was repeated for a long time.

EXAMPLE 17

In accordance with the process of Example 15 except using sodium caprylate at the same content instead of $Na_2C_2O_4$, a nucleating agent was produced and a test was carried out. It was confirmed that the product obtained by using the nucleating agent had the same heat storage-discharge characteristic as that of Example 15.

EXAMPLE 18

In accordance with the process of Example 15 except using $Na_3PO_4$ at the same content instead of $Na_2C_2O_4$, a test was carried out. It was confirmed that the product had the same heat storage-discharge characteristic as that of Example 15.

EXAMPLE 19

In accordance with the process of Example 15 except using trisodium citrate dihydrate at the same content instead of $Na_2C_2O_4$, a test was carried out. It was confirmed that the product had the same heat storage-discharge characteristic as that of Example 15.

EXAMPLE 20

In accordance with the process of Example 15 except using sodium L-glutamate monohydrate at the same content instead of $Na_2C_2O_4$, a test was repeated. It was confirmed that the product had the same heat storage-discharge characteristic as that of Example 15.

EXAMPLE 21

A mixture of 20 wt. % of $Na_2HPO_4$, 20 wt. % of polyethylene powder (average particle diameter of 100μ) and 60 wt. % of anhydrous sodium acetate was thoroughly mixed and pulverized, and about 1 g. of the mixture was hot-pressed at 80° C. under a pressure of 1000 $kg/cm^2$ to form a disc having a diameter of 15 mm and a thickness of 3 mm as a nucleating agent.

One disc was charged into 1 kg of $NaCH_3COO.3H_2O$ kept in an aluminum container and the container was sealed.

In a heat cycle test of 70° C.→45° C.→70° C. as one cycle (8 cycles per day), the supercooled state of the product was broken at about 53° C. and the smooth phase change was repeated for more than 400 times.

EXAMPLE 22

A mixture of 25 wt. % of $NaH_2PO_4$, 15 wt. % of rosin powder (100 mesh) and 60 wt. % of anhydrous sodium acetate was thoroughly mixed and pulverized and about 1 g. of the mixture was hot-pressed at 60° C. under a pressure of 200 $kg/cm^2$ to form a disc having a diameter of 15 mm and a thickness of 3 mm as a nucleating agent.

Two discs were charged into 1.5 kg. of a mixture of 90 wt. % of $NaCH_3COO.3H_2O$ and 10 wt. % of $NaBr.2H_2O$ kept in a cylindrical black polyethylene container having a diameter of 50 mm and a length of 800 mm and the container was sealed.

In a heat cycle test of 60° C.→40° C.→60° C. as one cycle, the supercooled state of the product was broken at about 50° C. and the smooth phase was repeated for more than 1000 times.

EXAMPLE 23

A mixture of 15 wt. % of $Na_2HPO_4.2H_2O$, 20 wt. % of carnauba wax powder and 65 wt. % of anhydrous sodium acetate was thoroughly mixed and pulverized and 1 kg. of the mixture was hot-pressed at 60° C. under a pressure of 600 $kg/cm^2$ to form a disc having a diameter of 15 mm and a thickness of 3 mm as a nucleating agent.

Two discs were charged into 2 kg. of a mixture of 84 wt. % of NaCH₃COO.3H₂O and 16 wt. % of NaHCOO.3H₂O kept in a polyethylene container and the container was sealed.

In the heat cycle test of 60° C.→40° C.→60° C. as one cycle, the supercooled state of the product was broken at about 47° C. and the smooth phase change was repeated for more than 500 times.

EXAMPLE 24

In accordance with the process of Example 22 except using respectively $NaH_2PO_4 \cdot H_2O$ and polypropylene powder (50 mesh) instead of $NaH_2PO_4$ and rosin powder and hot-pressing at 70° C. under a pressure of 400 kg/cm², a test was carried out. As a result, the supercooled state of the product was broken at about 50° C. and the smooth phase change was repeated for more than 1000 times.

EXAMPLE 25

In accordance with the process of Example 23 except using respectively $NaH_2PO_4$ and polyvinyl chloride powder (30 mesh) instead of $Na_2HPO_4 \cdot 2H_2O$ and carnauba wax, a test was carried out. As a result, the supercooled state of the product was broken at about 47° C. and the smooth phase change was repeated for more than 1000 times.

EXAMPLE 26

In accordance with the process of Example 21 except using respectively $NaH_2PO_4 \cdot 2H_2O$ and polystyrene powder (30 mesh) instead of $Na_2HPO_4$ and polyethylene powder, a test was carried out. As a result, the supercooled state of the product was broken at about 50° C. and the smooth phase change was repeated for more than 1000 times.

EXAMPLE 27

In accordance with the process of Example 21 except using polymethyl methacrylate powder instead of polyethylene powder, a test was carried out. As a result, the supercooled state of the product was broken at about 50° C. and the smooth phase change was repeated for more than 1000 times.

EXAMPLE 28

A mixture of 20 wt. % of $Na_2HPO_4$, 20 wt. % of polyethylene powder (average diameter of 100μ) and 60 wt. % of anhydrous sodium acetate was thoroughly mixed and pulverized and the mixture was hot-pressed at 80° C. under a pressure of 1000 kg/cm² by embedding one sheet of polyethylene mesh having a thickness of 0.5 mm, a diameter of 13 mm and a hole size of 2 mm in the center to form a disc having a diameter of 15 mm and a thickness of 3 mm.

One disc was charged into 1 kg. of NaCH₃COO.3H₂O kept in an aluminum container and the container was sealed.

In a heat cycle test of 70° C.-45° C. (8 cycles per day), the supercooled state of the product was broken at about 53° C. and the smooth phase change was repeated for more than 400 times.

EXAMPLE 29

A mixture of anhydrous sodium acetate, 25 wt. % of $NaH_2PO_4$ and 30 wt. % of rosin powder (100 mesh) as a binder was hot-pressed at 60° C. under a pressure of 200 kg/cm² by placing each nylon mesh having a thickness of 0.3 mm, a diameter of 15 mm and a hole size of 100 mesh on both surfaces to form a disc having a diameter of 15 mm and a thickness of 3 mm in a sandwich structure.

Two discs of the nucleating agent were charged into a mixture of NaCH₃COO.3H₂O and 10 wt. % of NaBr.2H₂O as a heat storage material kept in a black polyethylene container having an inner diameter of 50 mm, a length of 800 mm and the container was sealed.

In the heat cycle test of 60° C.-40° C., the supercooled state of the product was broken for more than 1000 times.

EXAMPLE 30

A mixture of 15 wt. % of $Na_2HPO_4 \cdot 2H_2O$, 40 wt. % of carnauba wax and 45 wt. % of anhydrous sodium acetate was thoroughly mixed and the mixture was hot-pressed at 60° C. under a pressure of 600 kg/cm² by placing each polyethylene mesh having a thickness of 0.5 mm, a diameter of 15 mm and a hole size of 50 mesh on both surfaces to form a disc having a diameter of 15 mm and a thickness of 3 mm in a sandwich structure. Each polyethylene mesh has a flange having a width of 1 mm and a height of 1 mm so as to cover all surface of the molded product by the polyethylene mesh by melt-bonding the polyethylene meshes at the flanges.

The molded product at a content of 0.05 wt. % was charged into a mixture of NaCH₃COO.3H₂O and 16 wt. % of NaHCOO.3H₂O, kept in a polyethylene container and the container was sealed.

In a heat cycle test of 60° C.-40° C., the smooth phase change was repeated for more than 500 times and an average temperature for solidification was 47° C. or higher.

EXAMPLE 31

In accordance with the process of Example 29 except using $NaH_2PO_4 \cdot H_2O$ instead of $NaH_2PO_4$ and using polypropylene powder instead of rosin powder as a binder and hot-pressing at 70° C. under a pressure of 400 kg/cm² by using polyvinyl chloride mesh instead of nylon mesh, a test was carried out. It was confirmed that the smooth phase change was repeated at 50° C. or higher.

EXAMPLE 32

In accordance with the process of Example 30 except using $NaH_2PO_4$ instead of $Na_2HPO_4 \cdot 2H_2O$ and using polyvinyl chloride powder instead of carnauba wax and hot-pressing the mixture with a polyethylene mesh, a test was carried out by using the nucleating agent. The supercooled state of the product was broken at an average temperature of 47° C. and the smooth phase change was repeated.

EXAMPLE 33

In accordance with the process of Example 28 except using $NaH_2PO_4 \cdot 2H_2O$ instead of $Na_2HPO_4$, and using polystyrene powder instead of polyethylene powder and hot-pressing the mixture by embedding one sheet of an iron mesh having a thickness of 0.3 mm, a diameter of 13 mm and a hole size of 3 mm at the center, a test was carried out. It was confirmed that the smooth phase change was repeated at 50° C. or higher by using the heat storage material with the nucleating agent.

EXAMPLE 34

In accordance with the process of Example 28 except using polymethyl methacrylate powder instead of polyethylene powder and hot-pressing the mixture by embedding one sheet of stainless steel mesh having a thickness of 0.3 mm, a diameter of 13 mm and a hole size of 3 mm at the center, a test was carried out. It was confirmed that the smooth phase change was repeated at 50° C. or higher by using the heat storage material with the nucleating agent.

We claim:

1. A heat storage material which comprises $NaCH_3COO.3H_2O$ as a main component and a nucleating agent comprising 95 to 10 wt.% of anhydrous sodium acetate and 5 to 90 wt.% of at least one other sodium salt selected from the group consisting of $Na_3PO_4$, $Na_2HPO_4$, $NaH_2PO_4$, $NaNH_4HPO_4.4H_2O$, $Na_5P_3O_{10}$, $C_6H_5Na_2.2H_2O$, $NaBO_2.2H_2O$, $Na_2B_4O_7.10H_2O$, $Na_2C_2O_4$, $NaBr$, $NaCl$, $CH_2(COONa)_2.H_2O$, $(CHCOONa)_2.H_2O$, $(CH_2COONa)_2.6H_2O$, $HOC(CH_2)_2(COONa)_3.2H_2O$, $CH_3(CH_2)_2COONa$, $CH_3(CH_2)_6COONa$, $HOOCCH(NH_2)(CH_2)_2COONa.H_2O$, sodium oleate, and sodium stearate.

2. The heat storage material according to claim 1 wherein said nucleating agent further comprises a thermoplastic organic material as a binder.

3. The heat storage material according to claim 2 wherein said thermoplastic organic material is a natural vegetable or animal wax which has a melting point of 60° C. or higher.

4. The heat storage material according to claim 2 wherein said thermoplastic organic material is a synthetic wax.

5. The heat storage material according to claim 2 wherein said thermoplastic organic material is a plastic resin selected from the group consisting of polyethylene, polypropylene, polystyrene, acrylic resin and polyvinyl chloride.

6. The heat storage material according to claim 2 wherein said anhydrous sodium acetate, said other sodium salt, said thermoplastic organic material and a network structured support are bonded in one-piece by a hot-press.

7. The heat storage material according to claim 6 wherein said network structured support is made of a plastic or a metal.

8. The heat storage material according to claim 6 wherein said network structured support is embedded in a mixture of anhydrous sodium acetate, the other sodium salt and said thermoplastic organic material.

9. The heat storage material according to claim 6 wherein two sheets of said network structured support are placed on both surfaces in a sandwich structure.

10. The heat storage material according to claim 6 wherein said network structured support covers all surfaces of said molded product.

11. The heat storage material according to claim 6, wherein the mesh of the network structured support has a diameter ranging from 50 to 5 mm.

12. The heat storage material according to claim 6 wherein said network structured support is fibrous material dispersed in the mixture of anhydrous sodium acetate, the other sodium salt and said thermoplastic organic material.

13. The heat storage material according to claim 12 wherein said fibrous material is at least one selected from the group consisting of metallic fiber, glass fiber, other inorganic fiber, carbon fiber and heat resistant organic fibers.

14. A heat storage material which comprises $NaCH_3COO.3H_2O$ having incorporated therein a molded product obtained by hot-pressing a mixture of anhydrous sodium acetate; at least one other sodium salt selected from the group consisting of $Na_3PO_4$, $Na_2HPO_4$, $NaH_2PO_4$, $NaNH_4HPO_4.4H_2O$, $Na_5P_3O_{10}$, $C_6H_5Na_2PO_4.2H_2O$, $NaBO_2.2H_2O$, $Na_2B_4O_7.10H_2O$, $Na_2C_2O_4$, $NaBr$, $NaCl$, $CH_2(COONa)_2.H_2O$, $(CHCOONa)_2.H_2O$, $(CH_2COONa).6H_2O$, $HOC(CH_2)_2(COONa)_3.2H_2O$, $CH_3(CH_2)_2COONa$, $CH_3(CH_2)_6COONa$, $HOOCCH(NH_2)(CH_2)_2COONa.H_2O$, sodium oleate, and sodium stearate; and a thermoplastic organic material.

15. The heat storage material according to claim 14 wherein said thermoplastic organic material is a powder having a diameter of 1 mm or less.

16. The heat storage material according to claim 14 wherein the pressure in said hot-pressing is 10 kg/cm² or higher.

17. The heat storage material according to claim 14 wherein the temperature in said hot-press is the melting point of said thermoplastic organic material or lower.

18. The heat storage material according to claim 6 or 14, wherein said $NaCH_3COO.3H_2O$ further comprises 5 to 20 wt. % of $NaHCOO.3H_2O$ or 5 to 15 wt. % of $NaBr.2H_2O$.

* * * * *